United States Patent
Ramnarain et al.

(10) Patent No.: US 10,273,134 B1
(45) Date of Patent: Apr. 30, 2019

(54) MECHANISM FOR ORIENTING PACKAGING ELEMENTS SUCH AS CONTAINER CAPS

(71) Applicant: PSR Automation Inc., Shakopee, MN (US)

(72) Inventors: David R. Ramnarain, Shakopee, MN (US); Brian D. Ramnarain, Shakopee, MN (US); Christopher D. Ramnarain, Shakopee, MN (US)

(73) Assignee: PSR Automation Inc., Shakopee, MN (US)

( * ) Notice: Subject to any disclaimer, the term of this patent is extended or adjusted under 35 U.S.C. 154(b) by 0 days.

(21) Appl. No.: 16/139,765

(22) Filed: Sep. 24, 2018

(51) Int. Cl.
*B65G 47/14* (2006.01)
*B67B 3/064* (2006.01)

(52) U.S. Cl.
CPC ........ *B67B 3/0645* (2013.01); *B65G 47/1457* (2013.01); *B67B 2201/06* (2013.01)

(58) Field of Classification Search
CPC .... B65G 47/12; B65G 47/14; B65G 47/1407; B65G 47/1428; B65G 47/1442; B65G 47/1457; B65G 47/1464; B65G 47/80; B65G 47/846; B65G 47/847; B65G 47/848; B65G 29/00; B65G 47/256; B67B 3/0645; B67B 2201/06

USPC ....... 198/382, 383, 384, 388, 389, 390, 393, 198/394, 396, 397.01, 397.02
See application file for complete search history.

(56) References Cited

U.S. PATENT DOCUMENTS

| | | | | | |
|---|---|---|---|---|---|
| 2,922,548 | A | * | 1/1960 | Anderson | B65G 47/1457 112/113 |
| 3,318,434 | A | * | 5/1967 | Waller | B67B 3/061 198/393 |
| 3,568,882 | A | * | 3/1971 | Aidlin | B23Q 7/02 198/388 |
| 3,572,494 | A | * | 3/1971 | Aidlin | B65G 47/1428 198/388 |
| 3,710,920 | A | * | 1/1973 | Sterling | B65G 47/14 198/380 |
| 3,791,553 | A | * | 2/1974 | Aidlin | B65G 47/1457 198/388 |
| 4,895,243 | A | * | 1/1990 | Graham | B65G 47/1457 198/392 |
| 9,440,801 | B1 | * | 9/2016 | Ramnarain | B65G 47/1428 |

* cited by examiner

*Primary Examiner* — Mark A Deuble
(74) *Attorney, Agent, or Firm* — Thomas J. Nikolai; DeWitt LLP

(57) ABSTRACT

Bottle caps are oriented and delivered in the proper orientation to a bottle capping machine by an apparatus having a rotating disk and radially extending tabs coupled to the disk such that the disks and radially extending tabs cooperate to carry properly oriented caps through a sort zone to an ejector. Improperly oriented caps fall from the disk without reaching the ejector.

14 Claims, 10 Drawing Sheets

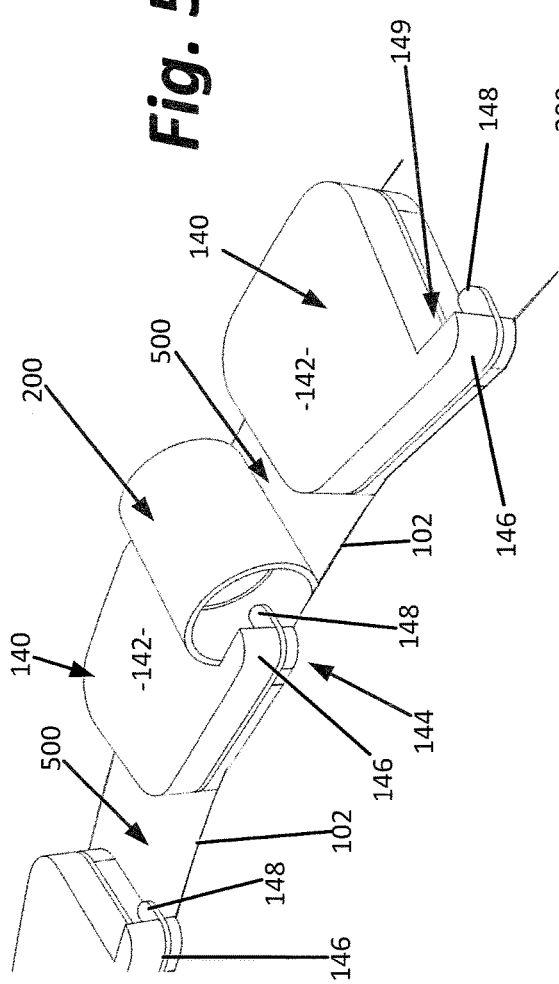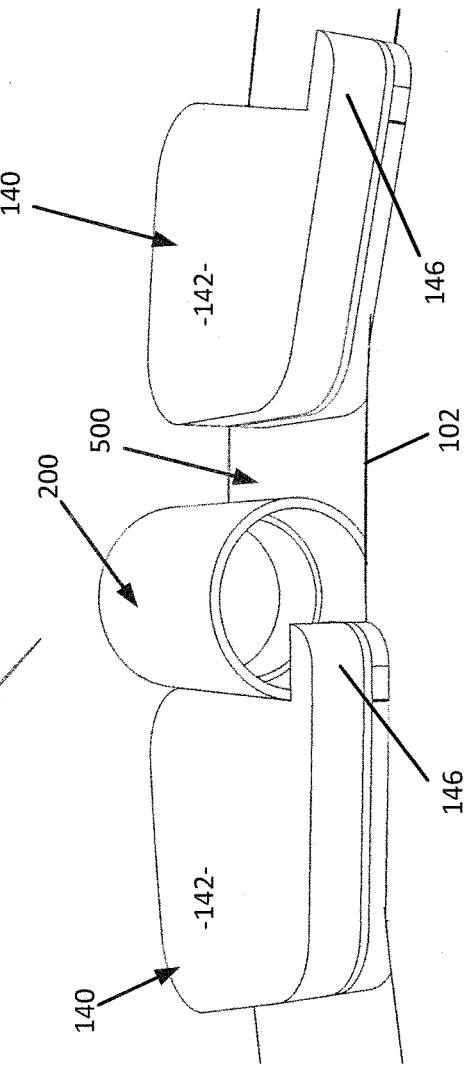

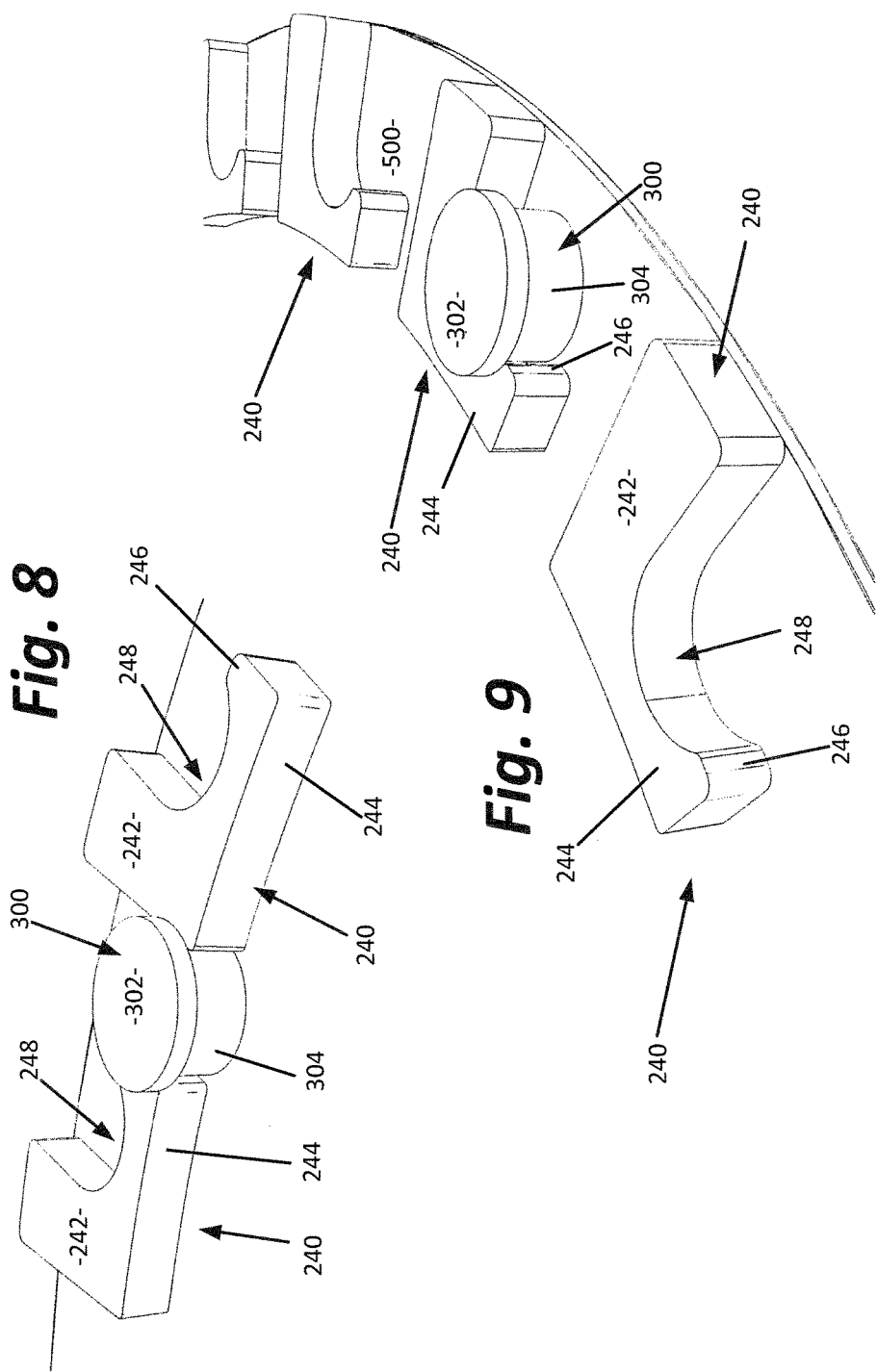

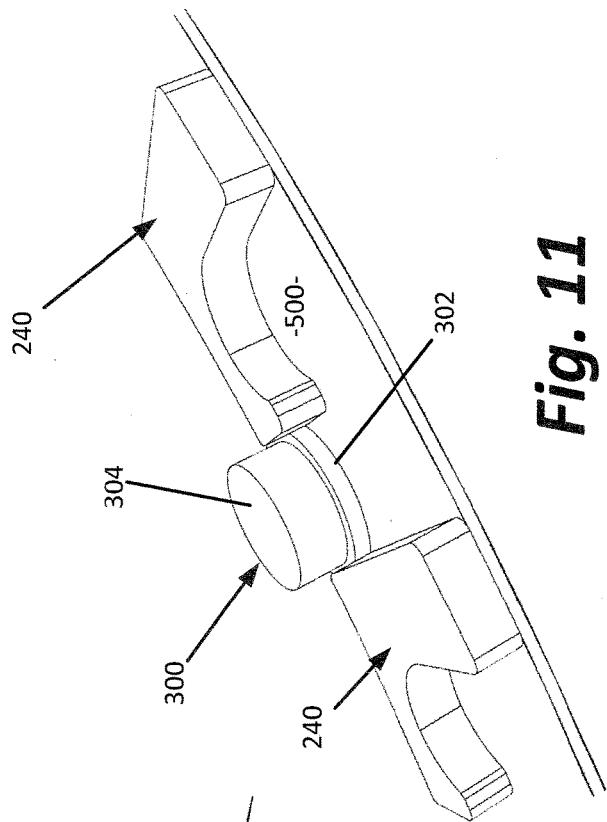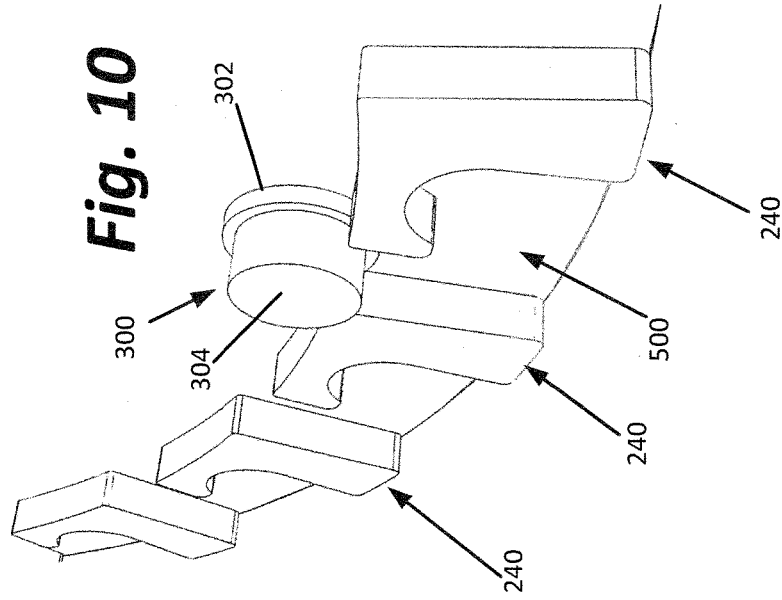

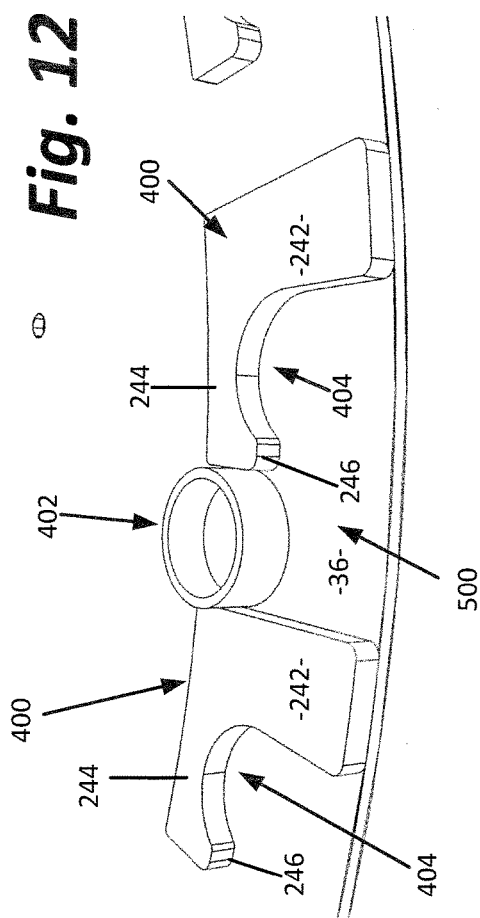
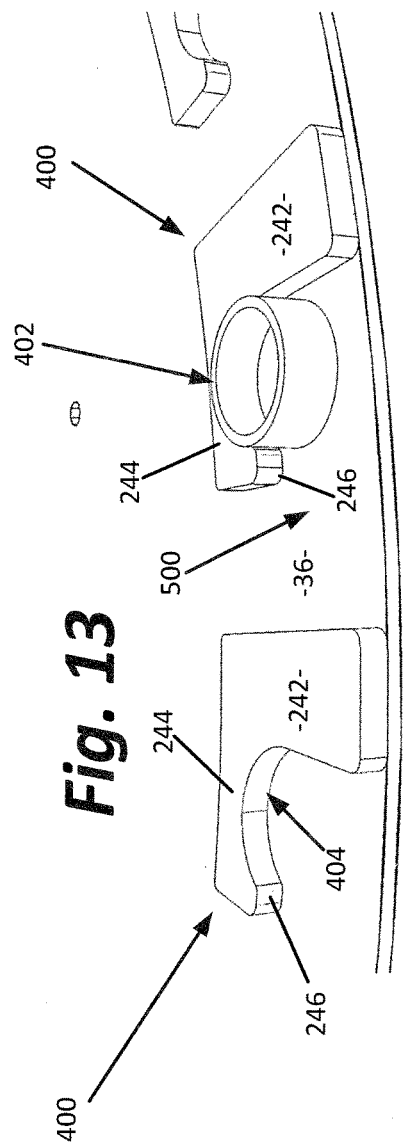

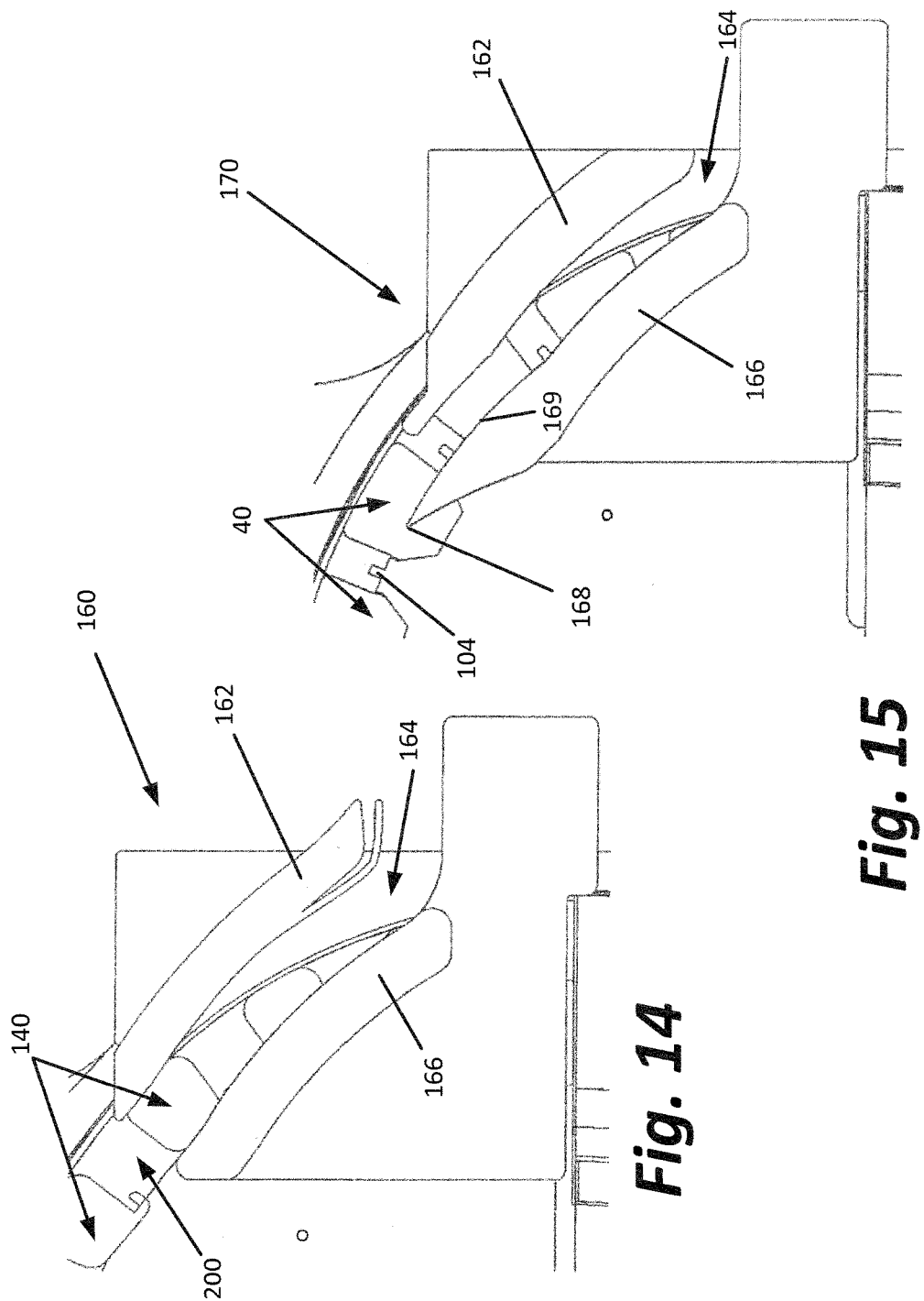

MECHANISM FOR ORIENTING PACKAGING ELEMENTS SUCH AS CONTAINER CAPS

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention concerns automated bottling equipment. More specifically, the present inventions relates to equipment used to orient caps so that the caps may be automatically coupled to a container after the container is filled.

II. Related Art

The closest art is U.S. Pat. No. 9,440,801 granted Sep. 13, 2016 to Ramnarain et al and entitled "Mechanism for Orienting Packaging Elements Such as Container Caps" (the '801 patent). The mechanism shown in that patent, incorporated in its entirety herein by reference, has proven to be highly effective for orienting container caps of many different styles and sizes. However, that mechanism has difficulty performing such an orientation function if the caps have a height greater than their diameter or if the caps have side walls having an exterior step such that the caps have more than one outside diameter. As such, there continues to be a need for a similar mechanism for sorting and orienting taller caps and caps having multiple diameters along their height.

SUMMARY OF THE INVENTION

The mechanism shown in the '801 patent comprises an alignment disk assembly 30. The present invention provides novel alternative alignment disk assemblies that can replace the disk assembly shown in the '801 patent to solve the problems associated with tall or multi-diameter caps.

In one novel embodiment, the inner disk member has an outwardly extending radial cap support tab centered between each adjacent pair of flights. These tabs will enter the open end of properly oriented caps positioned between the flights as the disk assembly rotates, but not the open end of the other caps. These other caps will be rejected and fall back into the cap receptacle rather than be carried by the rotating disk assembly to the discharge zone where they are extracted by a cap extractor.

In another embodiment, a lateral projection extends from a main body of each flight toward an adjacent flight and terminates in a radial extending cap support tab. The distance between the main body and cap support tab of each flight is slightly larger than the thickness of the walls of the caps such that the open end of properly oriented caps will mate with the tabs and other caps will not mate with the cap support tab. Again, this arrangement ensures that only properly oriented caps are carried to the discharge zone. All others are rejected and fall back into the cap receptacle.

In other novel embodiments, the shape of the flights have been modified to provide a J-hook extending toward an adjacent flight. More specifically, these flights have a lateral projection extending from the main body and terminating in a radially extending cap support tab. The main body, lateral projection and radially extending cap support tab cooperate to form a concaved cap receiver. Properly oriented caps are held by the concave cap receiver and are carried by the rotating disk assembly to the discharge zone. However, other caps are rejected before such caps reach the discharge zone.

The various embodiments disclosed above may also include a novel cap extractor located in the discharge zone. The cap extractors have a pair of rails. The top rail is made of a flexible plastic to prevent caps from jamming or tipping as they travel down the discharge chute. The bottom rail comes to a point and is employed to extract caps that have become wedged between the flights.

BRIEF DESCRIPTION OF THE DRAWINGS

The foregoing features, objects and advantages of the invention will become apparent to those skilled in the art from the following detailed description and with reference to the following drawings in which like numerals in the several views refer to corresponding parts:

FIGS. 5 and 6 show the manner in which properly oriented caps having a height taller than their diameter interact with the flights of the embodiment of FIG. 4;

FIGS. 8 and 9 illustrate how properly oriented caps having a first narrower diameter and a second wider diameter interact with the flights of the embodiment of FIG. 7;

FIGS. 10 and 11 illustrate how improperly oriented caps are rejected by the flights of the embodiment of FIG. 7;

FIGS. 12 and 13 illustrate a fifth embodiment similar to the embodiment of FIG. 7, but employed to sort taller caps which may be of a single diameter;

FIG. 14 shows a first novel embodiment of a cap extractor that may be employed in the discharge zone of an apparatus such as that shown in FIG. 1; and FIG. 15 shows a second novel embodiment of a cap extractor that may be employed in the discharge zone of an apparatus such as that shown in FIG. 1.

DETAILED DESCRIPTION

Figure 1:
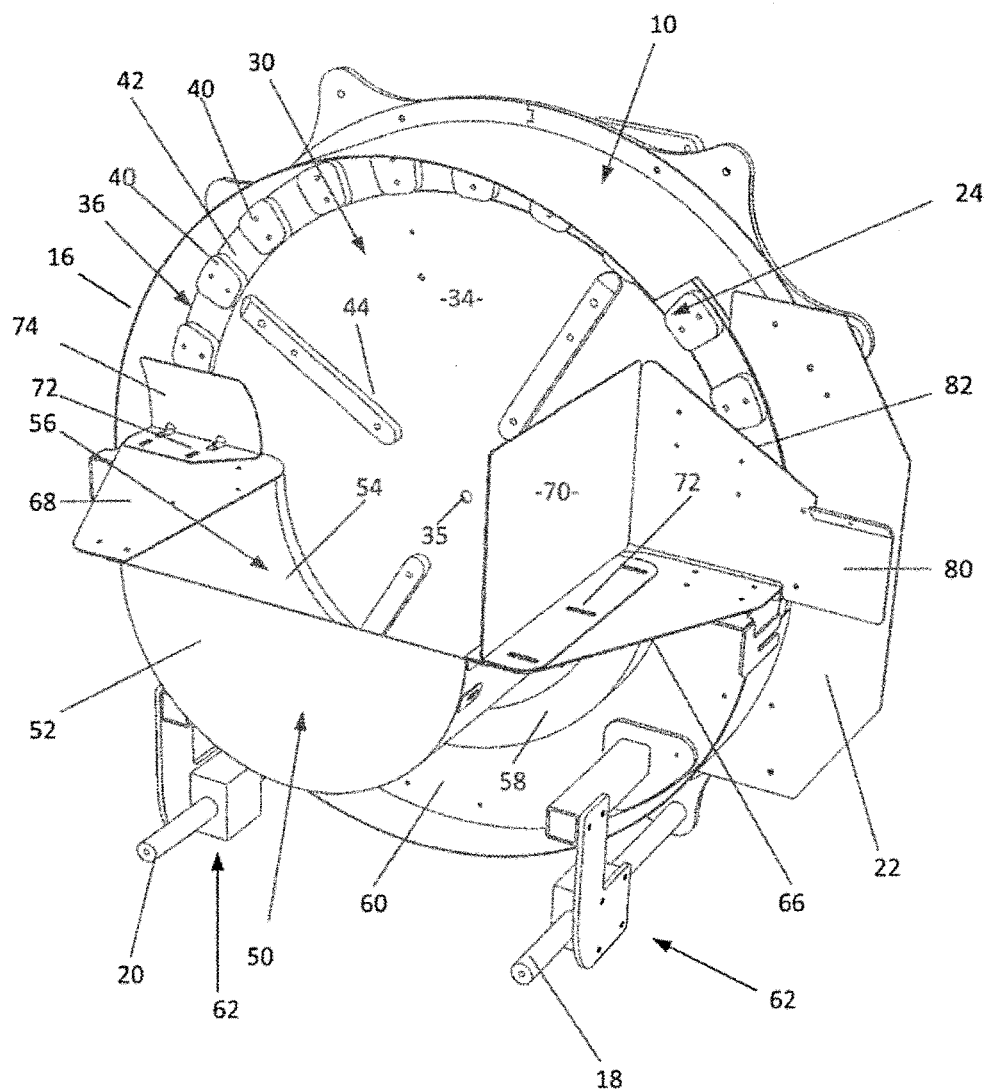
FIG. 1 is reproduced from the prior art '801 patent and shows an apparatus for orienting circular container caps.

In the following detailed description, reference is made to various exemplary embodiments in which the invention may be practiced. These embodiments are described with sufficient detail to enable those skilled in the art to practice the invention, and it is understood that other embodiments may be employed, and that structural and other changes may be made without departing from the spirit or scope of the present invention.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

FIG. 1, reproduced from the '801 patent, which is incorporated by reference in its entirety, shows a machine for aligning or oriented bottle caps and depositing the bottle caps in a capping machine (not shown). The machine has a housing 10, a rotating alignment disk assembly 30, a cap receptacle 50 positioned within a loading zone, and a discharge assembly 80 positioned in a discharge zone. The portion of the disk assembly 30 in the clockwise direction from the receptacle 50 and extending to the discharge assembly 80 serves as a sort zone of the prior art device shown in FIG. 1. Caps are sorted as the alignment disk assembly rotates in the clockwise direction.

The present invention relates to alternative rotating alignment disk assemblies that can replace rotatable alignment disk assembly 30 and also to cap extractors that can be used in place of or in addition to the discharge assembly 80.

Figure 2:
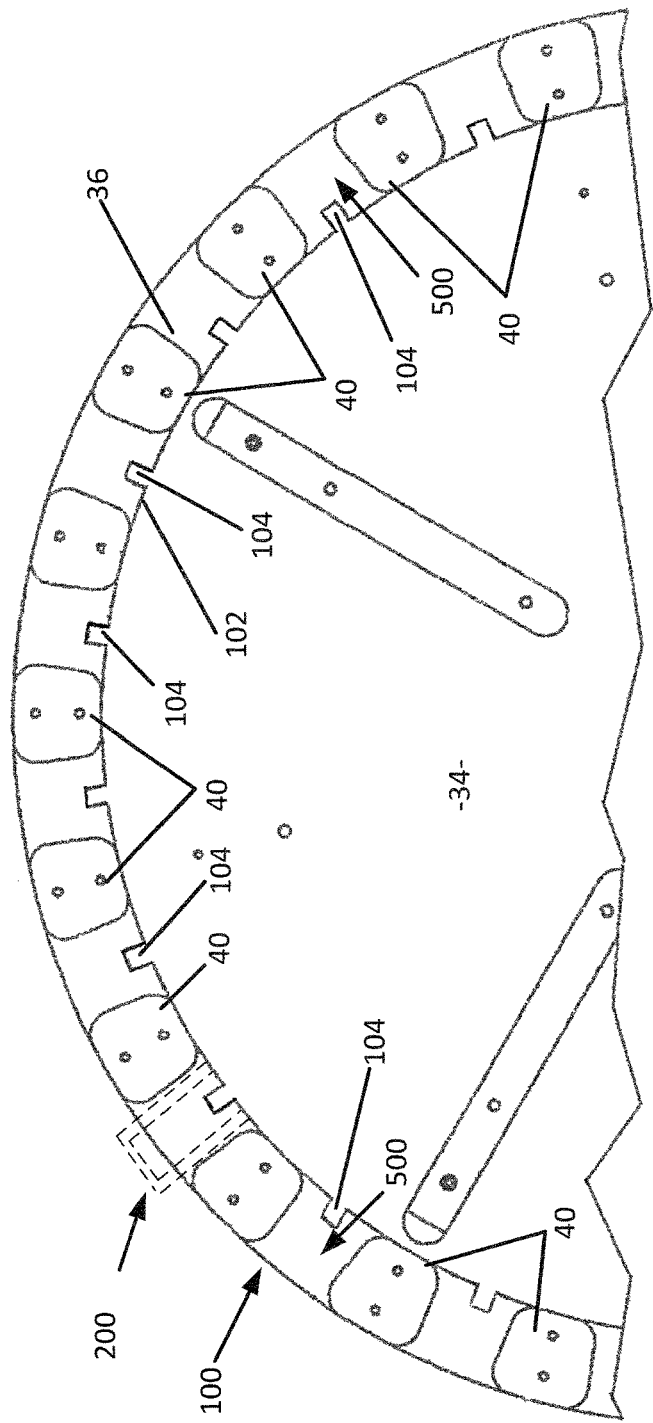
FIG. 2 shows a first alternative embodiment of an alignment disk assembly that can replace the alignment disk assembly shown in FIG. 1.

FIG. 2 shows a portion of a rotating alignment disk assembly 100 similar to the rotating disk assembly 30 shown in FIG. 1. Rotating disk assembly 100 comprises an inner disk member 34 and an outer disk member 36. The inner disk member 34 and outer disk member 36 are joined together and offset from each other by a cap supporting ledge 102 such that the plane of the outer surface of the inner disk member 34 is in front of the plane of the outer disk member 36.

Mounted on the outer disk member are flights 40. The flights 40 are generally equally and circumferentially spaced about the outer disk member 36 such that there are cap support pockets 500 formed between and defined by the adjacent pairs of flights. The distance between the flights 40 depends on the diameter of the caps to be oriented. The distance between the flights 40 should be greater than the diameter of the caps to be oriented and less than twice the diameter of the caps to be oriented.

The primary difference between the rotatable disk assembly 30 shown in the '801 patent and the rotating disk assembly 100 shown in FIG. 2 is the presence of a plurality of radially extending cap support tabs 104 extending radially from the outer peripheral edge of the inner disk 34. When the inner disk 34 and the outer disk 36 are assembled, the cap support tabs 102 are centrally located in the spaces between the adjacent flights 40. The cap support tabs 104 are adapted to mate with the open end of properly oriented caps such as cap 200. This allows the edge of the cap surrounding the cap's opening to come to rest on the ledge 102. Improperly oriented caps neither mate with the tab 104 nor come to rest on the ledge 102. This ensures that only a properly oriented cap will be transported to the discharge zone as the rotating disk assembly rotates.

Figure 3:
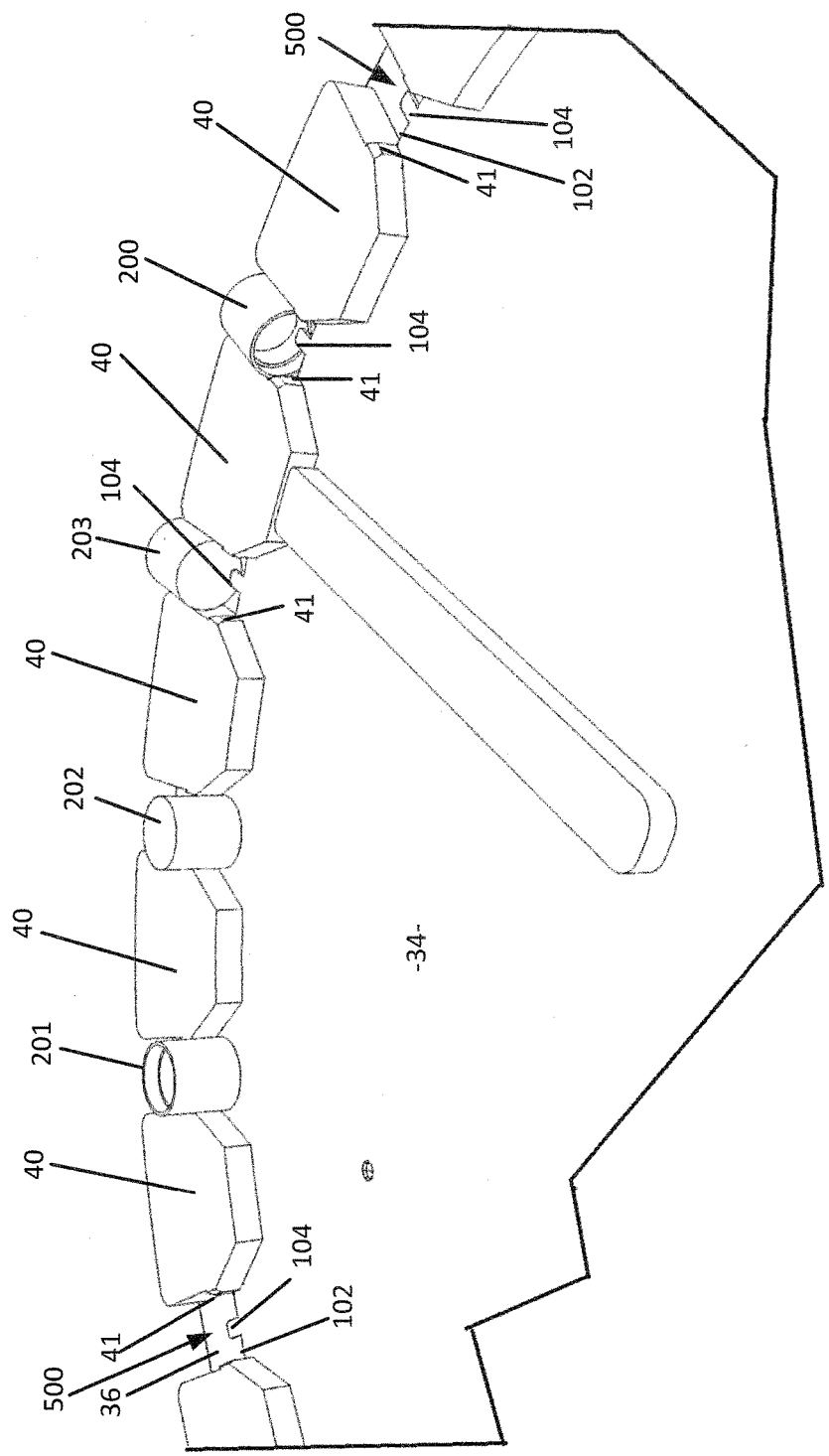
FIG. 3 shows a second alternative embodiment similar to the embodiment of FIG. 2, but in which the flights have ledge portions that cooperate with the ledge formed by the two disks to support properly oriented caps.

FIG. 3 shows another embodiment, like the embodiment of FIG. 2, but in which the flights 40 are provided with ledge portions 41 that are aligned with the ledge 102. Like FIG. 2, FIG. 3 also includes radially extending support tabs 104 extending from the outer peripheral edge of the inner disk 34 between each adjacent pair of the flights 40. If a cap is oriented sideways (like caps 201 and 202 in FIG. 3) or upside down (like caps 203 in FIG. 3), the caps will be rejected as they pass through a sort zone as the rotating alignment disk member 100 rotates. These caps will fall back into the cap receptacle 50. See FIG. 1. As such, only properly oriented caps, such as cap 200, will ever reach the discharge zone in the area of surrounding discharge assembly 80 shown in FIG. 1.

Providing the cap support tabs 104 that enter the open end of the caps 200 when the caps 200 are properly aligned, is particularly useful when the caps 200 have a relatively tall profile. As the open end of the properly oriented caps 200 receives the tabs 104, the edges surrounding the cap openings come to rest on the inwardly extending ledges 41 of the flights 40 and the ledge 102 provided between disks 34 and 36, as shown in FIG. 3. The ledge portions 41 also serve to prevent caps, such as 201 and 202, from fully entering the pockets 500 between the flights while the tabs 104 prevent an upside down cap, like cap 203, from sitting on ledge 102 and ledge portions 41. Thus, only properly oriented caps, like cap 200, are carried by the rotating disk assembly to the discharge zone. All other caps (e.g., caps 201-203) are rejected and fall back into the cap receptacle.

Figure 4:
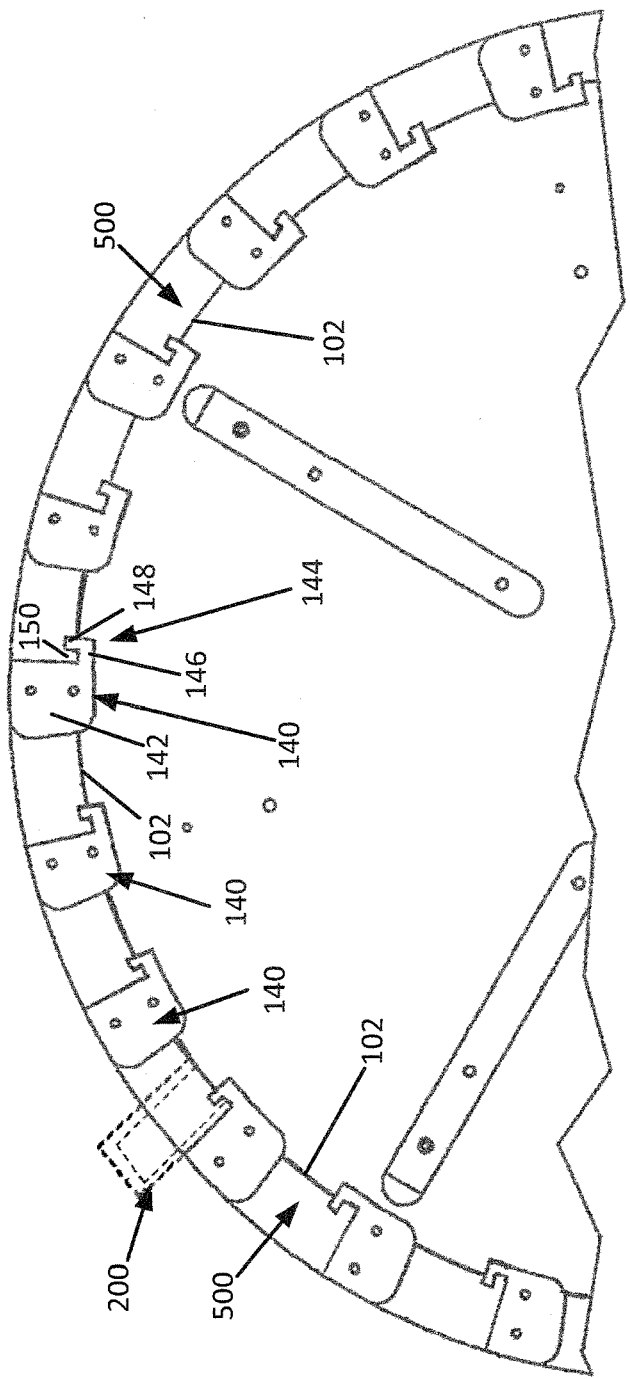
FIG. 4 shows a third alternative embodiment of an alignment disk assembly that can replace the alignment disk assembly shown in FIG. 1.
Figure 7:
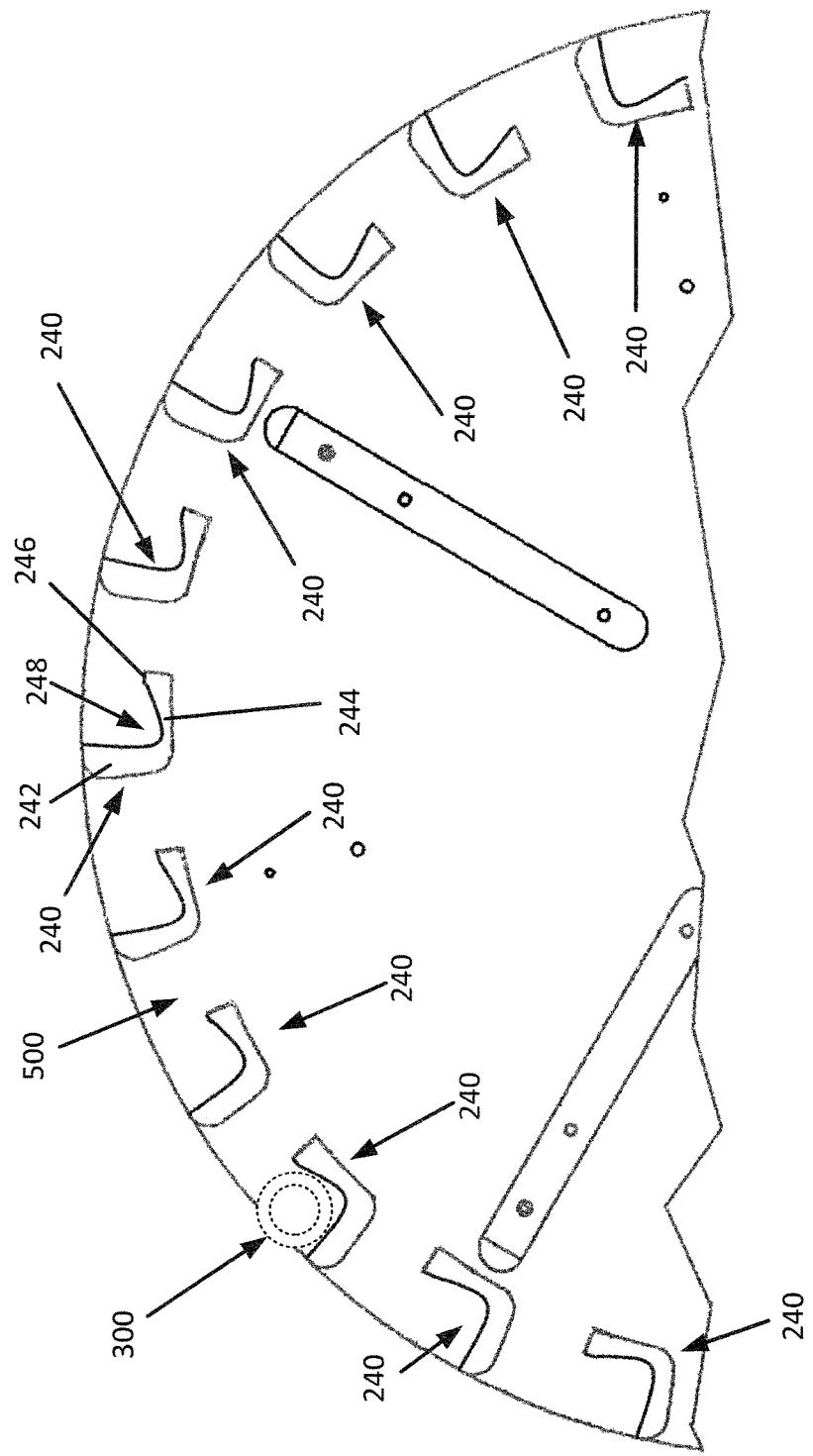
FIG. 7 shows a fourth alternative embodiment of an alignment disk assembly that can replace the alignment disk assembly shown in FIG. 1.

Another alternative embodiment is shown in FIGS. 4-6. In this embodiment, rather than modifying the inner disk 34 to provide the projections 104, projections 148 are provided by modifying the flights. Specifically, the flights 140 each have a main body 142. Extending in a clockwise direction from the main body 142 into pocket 500 is a hook 144 comprising a lateral projection 146 and a radially extending cap support tab 148. There is a gap 149 between the main body 142 of cap support tab 148. The tab 148 serves a function similar to the tabs 104 shown in FIGS. 2 and 3. Likewise, the lateral projections 146 are aligned with the ledge 102 such that lateral projections 146 cooperate with the ledge 102 in a fashion similar to the ledge portions 41 in FIG. 3.

In the embodiment of FIGS. 4-6, the projections 148 mate with the open end of the caps 200 to ensure that caps 200 are properly oriented with the open end facing in the proper direction. As a projection 148 is received by the open end of a cap 200, the edge surrounding the cap opening comes to rest upon the ledge 102 and the lateral projection 146. Properly oriented caps are supported and held in this fashion as they are moved by the rotating disk assembly from the cap receptacle to the discharge assembly. Again, any cap that is turned sideways or upside down in the pocket 500 between the flights 140 will be rejected as it passes through the sort zone and will fall back into the receptacle 50. Only caps that are properly oriented will reach the discharge zone.

FIGS. 7-11 show still another embodiment. This embodiment is particularly useful with caps, such as caps 300, having a stepped outer diameter. As shown, the caps 300 have a first section 302 and a second section 304. Section 302 has an outer diameter that is wider than the diameter of section 304. In the embodiment of FIGS. 7-11, the inner disk 34 is eliminated and the flights 240 secured to the outer disk comprise an J-shaped structure. More specifically, the flights 240 have a main body 242, a lateral projection 244, and a radially extending support tab 246. The surface 248 formed outwardly of the lateral projection between the main body 242, lateral projection 244 and tab 246 is concave so that it can cradle properly oriented caps.

As shown in FIG. 8, the space between two adjacent flights 240 is wider than the smaller diameter section 304 of cap 300. As best shown in FIG. 11, the space between two adjacent flights 240 is smaller than the diameter of the wider diameter section 302 of the cap 300. Thus, only properly oriented caps 300 can enter pocket 500 through this space and be cradled by surface 248, as shown in FIG. 9. Properly oriented caps, like the cap 300 in FIG. 9, are cradled and carried from the cap receptacle 50 in the loading zone to the discharge zone as the disk assembly rotates in the clockwise direction.

That improperly oriented caps are not so carried to the discharge zone is ensured by two characteristics of the flights 240. First, the distance between the tab 246 of one flight and the main body 242 of the closest adjacent flight is only slightly greater than the diameter of the smaller diameter portion 304 of the caps 300, as shown in FIG. 8, and is less than the diameter of the larger diameter portion 302 of the caps 300, as shown best in FIG. 11. Second, the radius of curvature of surface 248 and dimensions of the flights 240 are such that the wider diameter portion of the caps cannot be cradled by the flights 240. The concave recesses 248 are adapted to only be capable of holding the smaller diameter portion 304 of the caps 300, as shown in FIG. 9. Virtually all improperly oriented caps will be rejected within the receptacle of the loading zone as flights 240 pass through the loading zone because only the smaller diameter portion 304 of the caps 300 can pass between the flights 240 and be cradled by one of the flights. All other improperly oriented caps will be rejected as the disk assembly rotates because such caps 300 will not be cradled along surface 248 by the flights 240 as properly oriented caps are cradled. Improperly oriented caps 300, such as those shown in FIGS. 10 and 11, never reach the discharge zone.

A disk assembly similar to that shown in FIGS. 7-11 is shown in FIGS. 12-13. The primary difference relates to the thickness of the flights 400 as compared to the thickness of flights 240. The thickness of flights 400 is selected so that properly oriented caps, such as the caps 402 are held by the surface 404 as the disk assembly rotates. Note that in FIGS. 12 and 13 the open end of cap 402 faces away from disk 36. If, however, the cap 402 was reversed so that the closed end of the cap faced away from the disk 36, this would shift the center of gravity of the cap 402 such that it would no longer be supported by the surface 404 of the flight 400 as the disk assembly spins.

The embodiment of FIGS. 12-13 is well-suited for use with caps of any height. The thickness of the flights is simply selected or adjusted as dictated by the height and center of gravity of the caps. Typically, the taller the cap 402, the thicker the flight 400. The flight 400 should be thick enough to support properly oriented caps; i.e., caps with their closed end in contact with disk 36, and thin enough to reject caps having their closed ends facing away from disk 36. The weight of the closed end shifts the center of gravity of the cap from the center of the cap's height toward the closed end. As such, a flight 400 having a thickness about one-half the height of the caps to be sorted will typically work quite well. The embodiment of FIGS. 12-13 offers advantages in terms of weight reductions and overall material cost. Rather than making the disk 34 thicker to increase the depth of the ledge 102 to accommodate taller caps, the inner disk 34 is eliminated and the support to accommodate taller caps is provided by the flights.

The flights 400 in FIGS. 12-13, like the flights in FIGS. 7-11, have a main body 242, a lateral projection 244, and a radially extending support tab 246. As explained above, the thickness of the flights is determined by the height and center of gravity of the caps. The thickness of the flights is set so that a cap having its closed end adjacent the spinning disk will be retained and cradled by the flights as the disk spins and, thus carried from the cap receptacle in the loading zone through the sort zone to the discharge zone. Improperly oriented caps will fall out from between the flights 400 and back into the cap receptacle.

As should be clear from the foregoing description and drawings, each embodiment of the present invention includes a housing (e.g., housing 10 in FIG. 1), an alignment disk assembly, a cap receptacle mounted to the housing (e.g., cap receptacle 50 in FIG. 1), and a cap extractor mounted to the housing, (e.g., 80 in FIG. 1, 160 in FIGS. 14 and 170 in FIG. 15). In each embodiment, the alignment disk assembly is mounted for rotation within the housing about an axis of rotation. In each embodiment, the cap receptacle is adapted to funnel caps toward the alignment disk assembly and the cap extractor is adapted to redirect caps from the alignment disk.

Important improvements provided by the present invention relate to the construction of the alignment disk assembly. While multiple embodiments have been described above and shown in the drawings, each of the embodiments share common features. Each includes a first disk member 36 and a plurality of flights 40, 140, 240, or 400 secured to and projecting outwardly from the first disk member. In each embodiment, there is a predetermined circumferential spacing between the flights. In each embodiment, the flights have main body and cap support pockets 500 that are between the main bodies of adjacent pairs of the plurality of flights. These cap support pockets are each defined by an adjacent pair of the plurality of flights. In each embodiment, there are radially extending cap support tabs (e.g., 104, 148, 246) located between the main bodies of the flights of the adjacent pairs of the plurality of flights.

All of the embodiments operate in a similar fashion. When a plurality of caps is loaded into the cap receptacle and the alignment disk assembly is rotating, at least some of the caps enter the pockets 500 of the alignment disk assembly such that properly oriented caps are carried within the pockets by the flights to the cap extractor which causes such properly oriented caps to exit the apparatus. At the same time, improperly oriented caps either never enter the pockets or fall from the pockets back into the cap receptacle.

FIGS. 14 and 15 illustrate two alternative cap extractors 160 and 170 adapted to be located at the discharge zone. The extractor 160 shown in FIG. 14 comprises a flexible plastic top rail 162 which not only prevents the caps from tipping as they slide down the chute 164 as they are removed from the flights, but also serves to prevent the caps from jamming in the chute 164.

The cap extractor 170 shown in FIG. 15 likewise includes a top rail 162 that prevents the caps from tipping during extraction and this rail 162 may also be made of a flexible plastic material. The arrangement shown in FIG. 15 also includes a bottom rail 166 that terminates in a point 168 having a decoupling surface 169 extending from the point 168 and forming the top surface of the bottom rail 166. The arrangement of the point 168 and surface 169 serves to scoop out any caps that may become wedged between the flights 40. This arrangement is particularly useful when the alignment disk assemblies shown in any of FIGS. 2-6 are used. It also has some utility when the alignment disk assemblies of FIGS. 7-13 are being employed.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. An apparatus for orienting circular container caps comprising:
   a. a housing;
   b. an alignment disk assembly mounted for rotation within the housing about an axis of rotation, said alignment disk assembly having (i) a first and a second disk member, (ii) a plurality of flights secured to and projecting outwardly from and about the first disk member and having a first predetermined circumferential spacing between the plurality of flights, each of the flights having a main body, (iii) cap support pockets between the main bodies of adjacent pairs of said plurality of flights, said cap support pockets each defined by an adjacent pair of the plurality of flights, and (iv) a radially extending cap support tab located between the main bodies of the flights of the adjacent pairs of the plurality of flights, said cap support tabs extending radially outwardly from the second disk member;
   c. a cap receptacle mounted to the housing and adapted to funnel caps toward the alignment disk assembly; and
   d. a cap extractor mounted to the housing and adapted to redirect caps from the alignment disk;
   wherein when a plurality of caps is loaded into the cap receptacle and the alignment disk assembly is rotating, at least some of the caps enter the pockets of the alignment disk assembly such that (i) properly oriented caps are carried by the pockets to the cap extractor which causes such properly oriented caps to exit the apparatus, and (ii) improperly oriented caps fall from the pockets back into the cap receptacle.

2. The apparatus for orienting circular container caps of claim 1 wherein each of the flights has a lateral projection extending toward an adjacent flight and a cap support tab extend radially and outwardly from said lateral projection.

3. The apparatus for orienting circular container caps of claim 1 wherein said radially extending cap support tabs are adapted to enter an open end of a properly oriented cap, and cannot enter an open end of an improperly oriented cap.

4. The apparatus for orienting circular container caps of claim 2 wherein said main body, lateral projection and radially extending cap support tab forms a concave surface adapted to receive a portion of an edge surrounding an open end of a properly oriented cap.

5. The apparatus for orienting circular container caps of claim 2 wherein said main body, lateral projection and radially extending cap support tab forms a concave recess adapted to receive a portion of a side wall of a properly oriented cap.

6. The apparatus for orienting circular container caps of claim 1 wherein said cap extractor comprises a top rail adapted to prevent caps from tipping during extraction from the apparatus.

7. The apparatus for orienting circular container caps of claim 6 wherein said top rail is made of a flexible plastic material.

8. The apparatus for orienting circular container caps of claim 1 wherein said cap extractor has a bottom rail having a point adapted to engage and dislodge caps that became wedged in the cap support pockets.

9. An apparatus for orienting circular container caps comprising:
   a. a housing;
   b. an alignment disk assembly mounted for rotation within the housing about an axis of rotation, said alignment disk assembly having (i) a first disk member, (ii) a plurality of flights secured to and projecting outwardly from and about the first disk member and having a first predetermined circumferential spacing between the plurality of flights, each of the flights having a main body, (iii) cap support pockets between the main bodies of adjacent pairs of said plurality of flights, said cap support pockets each defined by an adjacent pair of the plurality of flights, (iv) a lateral projection extending toward an adjacent flight, and (v) a radially extending cap support tab located between the main bodies of the flights of the adjacent pairs of the plurality of flights and extending radially and outwardly from said lateral projection;
   c. a cap receptacle mounted to the housing and adapted to funnel caps toward the alignment disk assembly; and
   d. a cap extractor mounted to the housing and adapted to redirect caps from the alignment disk;
   wherein when a plurality of caps is loaded into the cap receptacle and the alignment disk assembly is rotating, at least some of the caps enter the pockets of the alignment disk assembly such that (i) properly oriented caps are carried by the pockets to the cap extractor which causes such properly oriented caps to exit the apparatus, and (ii) improperly oriented caps fall from the pockets back into the cap receptacle.

10. The apparatus for orienting circular container caps of claim 9 wherein the alignment disk assembly includes a second disk member and the radially extending cap support tabs located between the main bodies of the flights of the adjacent pairs of the plurality of flights extend radially outwardly from the second disk member.

11. The apparatus for orienting circular container caps of claim 10 wherein said main body, lateral projection and radially extending cap support tab forms a concave surface adapted to receive a portion of an edge surrounding an open end of a properly oriented cap.

12. The apparatus for orienting circular container caps of claim 9 wherein said cap extractor comprises a top rail adapted to prevent caps from tipping during extraction from the apparatus.

13. The apparatus for orienting circular container caps of claim 12 wherein said top rail is made of a flexible plastic material.

14. The apparatus for orienting circular container caps of claim 9 wherein said cap extractor has a bottom rail having a point adapted to engage and dislodge caps that became wedged in the cap support pockets.

* * * * *